United States Patent [19]

Yusko, Jr. et al.

[11] Patent Number: 4,800,920

[45] Date of Patent: Jan. 31, 1989

[54] PINCH VALVE

[75] Inventors: Edward M. Yusko, Jr., Demark; Cal R. Brown, Euclid; Terry M. Kalain, Willoughby; Peter C. Williams, Cleveland Heights, all of Ohio

[73] Assignee: Whitey Co., Highland Hts., Ohio

[21] Appl. No.: 177,971

[22] Filed: Apr. 5, 1988

[51] Int. Cl.[4] ............... F16K 37/00; F16K 7/07
[52] U.S. Cl. ............................. 137/556; 251/4; 251/5; 251/7
[58] Field of Search ............... 137/556, 559; 251/4, 251/5, 7, 8, 9

[56] References Cited

U.S. PATENT DOCUMENTS

| | | | |
|---|---|---|---|
| 2,112,592 | 3/1938 | MacClatchie | 251/4 |
| 2,197,995 | 4/1940 | Crowley | 251/7 |
| 2,627,674 | 2/1953 | Johnson | 434/67 |
| 3,299,904 | 1/1967 | Burke | 251/9 X |
| 3,350,053 | 10/1967 | Schmitz | 251/5 |
| 3,479,001 | 11/1969 | Dower | 251/4 |
| 3,481,610 | 12/1969 | Slator et al. | 251/5 X |
| 3,491,983 | 1/1970 | Van Damme et al. | 251/5 |
| 3,695,576 | 10/1972 | Kane et al. | 251/5 |
| 3,759,483 | 9/1973 | Baxter | 251/5 |
| 3,826,461 | 7/1974 | Summerfield et al. | 251/7 |
| 3,954,251 | 5/1976 | Callahan, Jr. et al. | 251/288 |
| 4,044,990 | 8/1977 | Summerfield | 251/8 |
| 4,303,222 | 12/1981 | Campbell | 251/7 |
| 4,442,954 | 4/1984 | Bergandy | 251/5 X |
| 4,518,145 | 5/1985 | Keltz et al. | 251/5 |
| 4,586,873 | 5/1986 | Lepretre et al. | 251/5 X |
| 4,660,802 | 4/1987 | Oscarson | 251/9 |
| 4,682,755 | 7/1987 | Bernstein et al. | 251/4 |

Primary Examiner—John Rivell
Attorney, Agent, or Firm—Fay, Sharpe, Beall, Fagan, Minnich & McKee

[57] ABSTRACT

An elastomeric sleeve is placed under axial compression in a pinch valve assembly. The axial compression of the sleeve eliminates any crevices with end members that engage opposed end walls of the valve body. Further, axial compression extends cycle life of the valve by maintaining the sleeve in a non-tensile relationship. Mechanical gripping between enlarged flanges defined at opposed ends of the sleeve is also enhanced through axial compression of the sleeve. A positive, visual indication of valve open and closed positions is provided by an indicator stem extending outwardly from an actuator body.

14 Claims, 3 Drawing Sheets

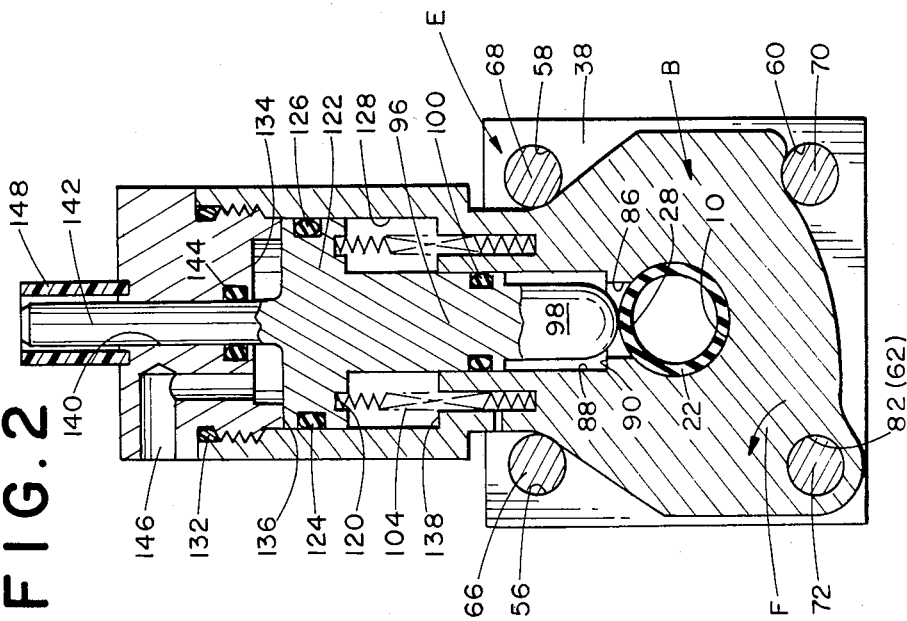
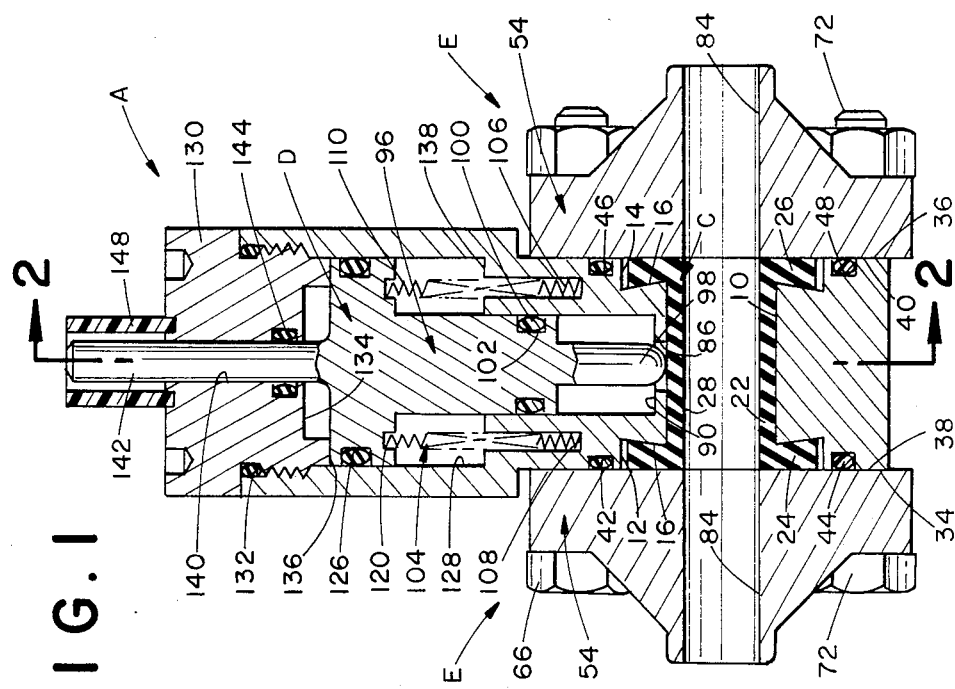

FIG. 5
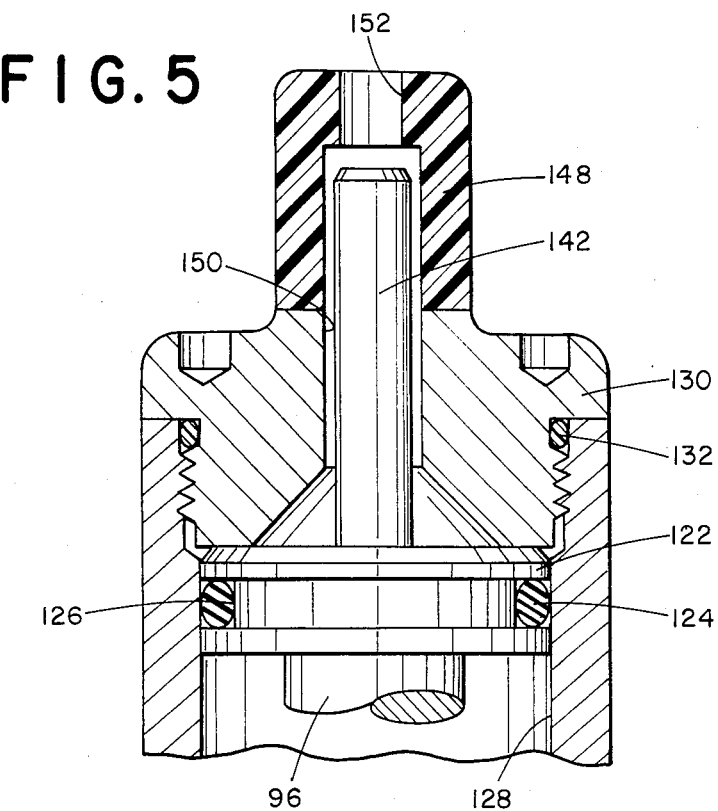
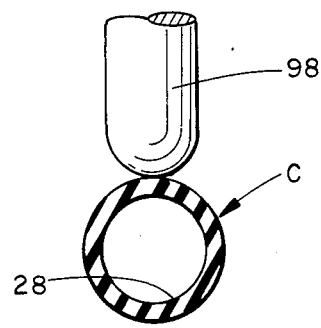
FIG. 6A
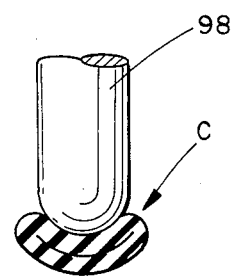
FIG. 6B

PINCH VALVE

BACKGROUND OF THE INVENTION

This invention pertains to the art of fluid flow regulation and more particularly to shutoff type flow valves. The invention is particularly applicable to a particular type of valve generally known as a pinch valve for use in a biotechnological environment. The pinch valve incorporates a flexible, substantially tubular member that is selectively compressed along an exterior portion to close a central flow passage and will be described with particular reference thereto. However, it will be appreciated that the invention has broader applications and may be advantageously employed in other environments and applications.

Handling of biotechnological components requires an ultra-clean environment and special safeguards to minimize damage to biological material such as elongated chains. Specifically, a smooth, reliable shutoff arrangement is required and dependable drainability of the flow line is necessary to prevent entrapment of the biological material. Only certain types of materials may be utilized in the valve construction due to the potential for interaction with the biological material in the fluid.

Typically, pinch valves incorporate a flexible or elastomeric sleeve that is compressed along an exterior portion to selectively open and close a central fluid passage defined through the sleeve. The life cycle of such a flexible sleeve is dependent on the strength and wear characteristics of the elastomeric material. Particularly, closing the valve places the sleeve member under tensile forces which, with repeated flexing or cycling, tends to become stretched and unusable.

For example, U.S. Pat. No. 3,350,053 to Schmitz, issued Oct. 31, 1967, describes some of the problems inherent with pinch valves utilized in the industry. One solution proposed in that patent to the repeated flexing of the elastomeric sleeve is to reduce the diameter to length ratio of the valve body and sleeve to as low a value as possible. It is believed that this ratio reduction provides a compact structure that limits the stretching of the resilient material of the sleeve.

Another avenue of attack for increasing the cycle life of the sleeve is to limit forces tending to pull end flanges of the sleeve toward the center of the valve. The solution offered by the Schmitz patent to this problem is to employ a preselected bulge molded into the sleeve between the end flanges. In this manner, the sleeve is positioned in an unstretched, slack arrangement and a valve actuating member has a predetermined range of movement that takes up the slack molded into the sleeve. Thus, the sleeve experiences reduced, if any, tensile forces as a result of actuator movement to a closed position. Although suitable for some fluid applications, it is considered desirable to eliminate the bulge molded into the sleeve because of the potential entrapment of biological material and variation in the flow passage configuration that disrupts the pursuit of laminar flow conditions.

Yet another problem associated with remotely operated valves of this type is the lack of any indication of the valve open or closed positions. It is critical to readily determine whether or not fluid flow is shut off so that downstream operations for repair, servicing, and the like, may be conducted. Prior pinch valve structures have failed to adequately address this situation.

Still another area of concern is the drainability of the valve that may be effected through the type of actuation mechanism or repeated flexing of the valve sleeve. Although the elastomeric materials utilized in the makeup of the valve sleeve have resilient properties, continued flexing or cycling results in stretching or permanent deformation of the valve sleeve. If the sleeve is closed through the application of peripheral forces along a bottom portion of the sleeve as is common in prior pinch valve structures, stretching or deformation may result. This, in turn, inhibits drainability of the valve after the valve has been in use for an extended period of time since fluid upstream of the actuating area of the sleeve will not freely drain along the bottom portion.

The subject invention contemplates a new and improved pinch valve arrangement that overcomes all of the above referenced problems and others and provides an easily assembled, reliable valve structure.

SUMMARY OF THE INVENTION

According to the present invention, there is provided an improved pinch valve arrangement particularly adapted for biotechnological environments.

According to a more limited aspect of the invention, the valve includes a rigid body having an opening for receiving a flexible sleeve therein. The flexible sleeve has an unstressed, predetermined axial dimension greater than the axial dimension of the body. First and second end members are received on either end of the body for retaining the sleeve against axial movement. The end members place the sleeve under compression thereby reducing the axial dimension of the sleeve to closely approximate that of the body.

According to a more limited aspect of the invention, the valve body includes counterbores disposed on the body and facing each end member. The counterbores extend radially outward and axially inward from end walls of the body and receive enlarged flanges of the sleeve therein. This counterbore arrangement accommodates expansion of the flanges to eliminate crevices between the sleeve and end members and securely engage the sleeve to the valve body.

According to a more limited aspect of the invention, an actuating member includes an indicating stem extending outwardly from the valve body to positively indicate valve open and closed positions.

A principal advantage of the invention resides in the improved operation of the valve sleeve.

Yet another advantage is found in the ultra-clean valve that results from this structure.

Still another advantage is realized in the positive indication of valve open and closed positions.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 1 is a vertical, longitudinal cross-sectional view of a pinch valve constructed in accordance with the subject invention;

FIG. 2 is a view generally along the lines 2—2 of FIG. 1;

FIG. 5 is a modified arrangement of a fluid operated actuator;

FIG. 6A is a representation of the valve sleeve and actuating member in a valve open position; and, FIG. 6B is a representation of the actuating member and sleeve in a valve closed position.

DETAILED DESCRIPTION OF THE PREFERRED EMBODIMENTS

Figure 3:
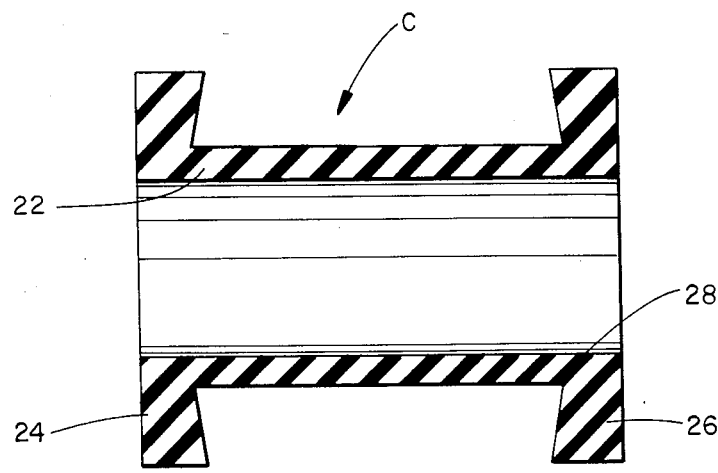
FIG. 3 is a cross-sectional view of the valve sleeve according to the subject invention.

Referring now to the drawings wherein the showings are for purposes of illustrating the preferred embodiments of the invention only and not for purposes of limiting same, the Figures show a pinch valve A having a central valve body B, an elastomeric sleeve C, actuating mechanism D, and opposed valve body end members E.

More particularly, the valve body is of rigid construction, preferably stainless steel. A first axial bore 10 extends through the body for receipt of the elastomeric sleeve. First and second counterbores 12, 14 are disposed at opposite ends of the bore for reasons which will become more apparent hereinbelow. Each counterbore defines a generally radially extending shoulder 16 with the bore. The shoulders 16 are configured to extend axially inward as they extend radially outward from the bore to the respective counterbore sidewall.

The sleeve C includes a generally cylindrical central portion 22 having an outer peripheral dimension closely received in the bore 10. Enlarged radially extending flanges 24, 26 are defined at opposite ends of the sleeve. The flanges increase in axial dimension as they extend radially outward from a central opening 28 of the sleeve. That is, the configuration of the flanges approximates the configurations of counterbores 12, 14 in which they are respectively received.

The end members E are received on opposite ends of the central valve body B to matingly engage first and second end walls 34, 36 of the valve body. Specifically, generally planar walls 38, 40 abuttingly engage the end walls 34, 36, respectively. A first groove 42 is defined in the end wall 34 to receive seal member 44 and, likewise, second groove 46 is defined in end wall 36 to receive a seal member such as O-ring 48. The seal members provide a back-up seal arrangement between the central valve body and end members as will become more apparent below. Since the end members are of identical construction, description of the left-hand end member will be equally applicable to the right-hand end member unless noted otherwise.

An enlarged portion 54 is disposed adjacent the valve body and includes four generally equally spaced openings 56, 58, 60, 62 adapted to receive fastening means such as nut and bolt type fasteners 66, 68, 70, 72. The fasteners extend freely through the enlarged portions of the end members and three of them, namely, 66, 68, 70 are disposed along peripheral portions of the valve body B (FIG. 2). The fourth fastener 72 extends through a lobe portion 80 of the central valve body. The lobe portion includes an axially extending opening 82 that is concentric with openings 62 of the end members when the valve is assembled.

As detailed in commonly assigned U.S. Pat. No. 3,954,251 to Callahan, Jr., et al., issued May 4, 1976, this valve body and fastener arrangement provides a swingout feature of the central valve body relative to the valve body end members by removal of a single fastener. Particularly, removal of fastener 66 permits the valve body to rotate around fastener 72 in a counterclockwise manner as illustrated by arrow F. This structural arrangement facilitates ease of replacement of the seal members 44, 48 or provides access to the elastomeric sleeve C if replacement is necessary. Throughout the change-over process, the central valve body is held in axial position relative to the end members such that proper realignment is achieved merely by rotating the central body back into its original position shown in FIG. 2. Since details are described in the noted patent and form no part of the subject invention, further discussion herein is deemed unnecessary.

The end members also include through passages 84 that define either an inlet or an outlet to the central valve body. Suitable connections can be made to an associated fluid system through well known pipe or fluid connection means as conventionally used in the art. When the valve is assembled, the passages 84 and sleeve openings 28 define a straight flow-through passage of substantially constant diameter that limits potential shearing of the biological material in the fluid and promotes laminar flow.

As illustrated in FIGS. 1 and 2, a bore 86 extends through the central valve body and generally perpendicular to bore 10. Counterbore 88 extends coaxially therefrom defining a radial shoulder 90. The actuating mechanism D includes a closure member 96 having a reduced diameter tip 98 dimensioned for close receipt through bore 86. The tip 98 preferably has a rounded end for engagement with cylindrical portion 22 of the sleeve as will be described in greater detail below. The tip can have a blade-like configuration as apparent in FIGS. 1 and 2 or a cylindrical configuration as illustrated in FIGS. 6A and 6B. Of course, still other tip configurations having a rounded end can be used without departing from the scope and intent of the subject invention.

A seal member such as O-ring 100 is received in a peripheral groove 102 on the closure member to seal between the closure member and counterbore 88. According to the preferred embodiment, the closure member cooperates with a biasing means such as spring 104. The spring has a first or lower end 106 received in an annular recess 108. The second or upper end 110 of the spring is received in an annular groove 120 of closure member piston 122. Receipt of opposite ends of the spring in the recess and groove maintains alignment of the closure member in counterbore 88 and normally biases the closure member outward to a valve open position. A seal member such as O-ring 124 is received in a peripheral groove 126 of the piston to sealingly engage a second enlarged counterbore 128. A closure cap 130 is threadedly received in an upper end of the valve body and is sealingly engaged therewith by means of yet another seal member such as O-ring 132. Additionally, an inner end of the closure cap has a reduced diameter recess 134 that extends outwardly from a stop shoulder 136 and limits outward biasing movement of the piston and closure member. Shoulder 138 defined between counterbores 88, 128 defines a stop surface that limits inward movement of the piston.

An opening 140 is defined in the recess 134 and receives a stem 142 therethrough extending outwardly from an upper face of the piston. In the embodiment of FIGS. 1 and 2, the stem is slidably and sealingly received through the opening by means of seal member 144. Thus, an inlet 146 is also formed in the closure cap to permit fluid such as air under pressure to selectively enter recess 134 and overcome the bias of spring 104 thereby advancing the piston and closure member toward the elastomeric sleeve. The tip 98 is advanced against the cylindrical portion of the sleeve and "pinches" the sleeve to a closed position (FIG. 6B). Removal of the air pressure from inlet 146 permits the spring 104 to bias the piston and closure member back to a normally open position, thus restoring the tip and sleeve to the FIG. 6A position.

A transparent shroud 148 extends outwardly from the closure cap and receives the outer end of the stem 142. In a valve open position, the stem is clearly visible through the shroud. On the other hand, in the valve closed position, the closure member has moved downwardly to pinch the elastomeric valve sleeve so that stem cannot be seen through the shroud. This provides a positive visual indication of the valve open and closed positions.

According to the modified actuator embodiment of FIG. 5, the inlet 146 is removed from the closure cap and opening 140 is enlarged to define an annular inlet passage 150. The shroud 148 includes an opening 152 at its outer end for communication with an external fluid supply (not shown) to permit fluid flow to the upper face of the piston. This arrangement provides for a dual use of the shroud 148 as both a valve open/closed indicator and the inlet for the remote actuator system. Still further, the modified actuator arrangement eliminates the use of one sliding seal member, notably seal member 144. In all other respects, the modified valve structure operates as disclosed with respect to the previous embodiment.

Figure 4:
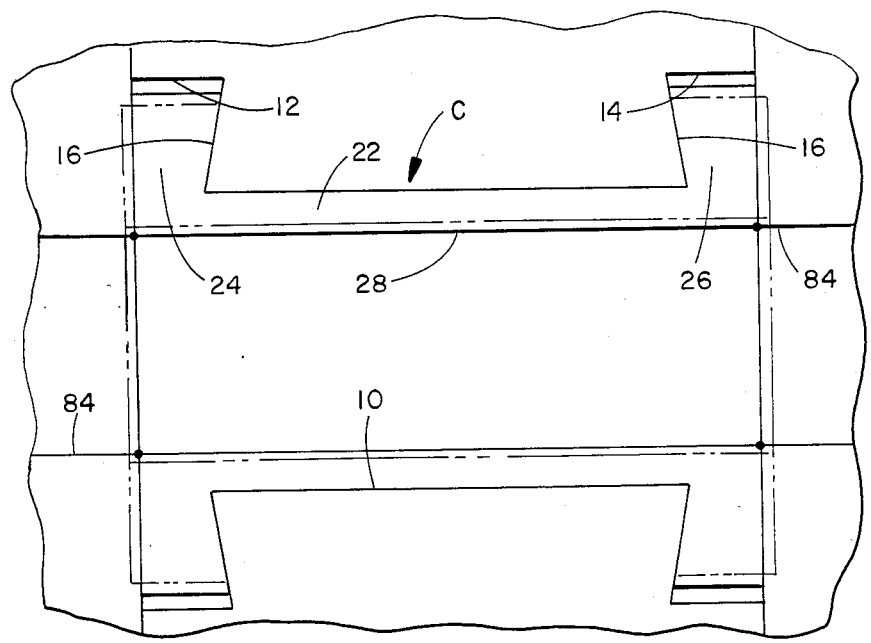
FIG. 4 is an enlarged, cross-sectional view illustrating the stressed and unstressed states of the elastomeric sleeve and cooperation with the valve body.

When used in ultra-clean environments such as the biotechnological applications discussed above, it is critical that all crevices in the fluid flow passage be eliminated to minimize the chance for entrapment of particles. To accomplish this objective in the present application, and with particular reference to FIG. 4, the unstressed configuration of the elastomeric sleeve is illustrated in phantom while the final, assembled configuration is shown in solid lines. As is apparent, the axial dimension of the unstressed sleeve is somewhat greater than that of the central valve body. When the end members are brought into an assembled, sealing engagement with the valve body, the sleeve is axially compressed which results in a number of benefits. Particularly, the crosssectional dimension of the sleeve opening 28 is reduced to closely approximate that of openings 84 in the end members. Stated another way, axial compression of the sleeve provides a radial expansion of the sleeve to eliminate any crevices between the body and end members. An obstructed, straight flow-through passage is thus defined by the assembled valve.

Axial compression of the sleeve also provides a primary seal between the end members and valve body. Thus, seal members 44, 48 are secondary seals that guard against fluid loss should the elastic element rupture. They are not the primary seals. The radial outward expansion of the flanges also promotes a secure mechanical engagement between the sleeve and valve body along the shoulders 16 of the first and second counterbores 12, 14. This prevents pullout of the flanges resulting from forces imposed by the closure member advancing and retracting between open and closed positions.

Yet another advantage is realized by the compression of the valve sleeve. Prior arrangements molded a predetermined bulge into the central portion of the sleeve to accommodate the tensile forces on the sleeve by the pinch arrangement. By axially compressing the sleeve in the present application and placing the sleeve in a compressive state, tensile forces do arise in the sleeve until a point much later in the closing stroke of the closure member 96. That is, the initial portion of the closing stroke transforms the sleeve from a compression to a neutral or non-compressive state. Further pinching of the valve sleeve during the closing stroke results in tensile forces in the valve sleeve but these tensile forces are not encountered until much later in the closing stroke then previous structures. Thus, the overall valve design has a higher cycle life rating due to the lower tensile forces. Concurrently the pullout forces imposed on the flanges are reduced.

As is also apparent, the valve sleeve is only pinched from the upper side by the actuating mechanism as opposed to pinching from diametrically opposite sides of the sleeve. This is important from the aspect that the lower side of the valve sleeve as shown in FIGS. 1 and 2 never undergoes any cycling or deformation. In the biotechnological field it is imperative that the flow passage not be obstructed or form any traps for the fluid. By not actuating the lower portion of the valve sleeve drainability is enhanced.

The invention has been described with reference to the preferred embodiments. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A valve comprising:
    a body having an opening extending between first and second end walls for communication with an inlet defined in a first end member and an outlet defined in a second end member, said end members being disposed on opposite sides of said body;
    a flexible member closely received in said opening, said flexible member having first and second enlarged flanges abuttingly engaging said first and second end members and a bore extending through said flexible member having a diametrical dimension substantially identical to said inlet and outlet, said flexible member having an unstressed, first axial dimension greater than a second axial dimension defined between said body end walls;
    means for interconnecting said first and second end members together and axially compressing said flexible member; and,
    an actuation member disposed in said body for selective reciprocation toward and away from said flexible member and adapted for close receipt through a pinch opening in said body disposed generally perpendicular to said body opening.

2. The valve as defined in claim 1 wherein said body includes an actuating chamber having a guide portion extending coaxially from said pinch opening, said guide portion dimensioned to receive an integrally formed pinch member stem for maintaining linear movement of said actuation member.

3. The valve as defined in claim 2 further comprising a seal member interposed between said pinch member stem and guide portion.

4. The valve as defined in claim 1 wherein said actuation member has a smooth, rounded end for engaging said flexible member.

5. The valve as defined in claim 4 wherein said actuation member includes a piston integrally formed thereon at a location remote from said rounded end, said piston being closely received in an actuating chamber.

6. The valve as defined in claim 4 wherein said actuation member includes an indicating stem at an end opposite from said rounded end, said indicating stem extending outwardly from said body in a valve open position.

7. The valve as defined in claim 6 further comprising means for biasing said actuation member towards the valve open position.

8. The valve as defined in claim 1 wherein said flanges have tapered configurations that increase in axial dimension as said flanges extend radially outward.

9. The valve as defined in claim 1 wherein said actuation member has a cylindrical configuration with a rounded, spherical end.

10. The valve as defined in claim 1 wherein said actuation member has a blade configuration with a smooth, rounded end.

11. A valve comprising:
   a body having an opening extending between first and second end walls for communication with an inlet defined in a first end member and an outlet defined in a second end member, said end members being disposed on opposite sides of said body;
   a flexible member closely received in said opening, said flexible member having first and second end flanges, respectively, and a bore extending between said flanges having a diametrical dimension substantially identical to said inlet and outlet, said flexible member having an unstressed, first axial dimension greater than a second axial dimension defined between said body end walls;
   means for interconnecting said first and second end members to said body and axially compressing said flexible member to said second axial dimension;
   an actuating member disposed in said body for selective reciprocation toward and away from said flexible member and adapted for close receipt through a pinch opening in said body disposed generally perpendicular to said body opening; and,
   an indicator stem selectively extending outward from said body to provide positive indication of valve open and closed positions.

12. The valve as defined in claim 11 further comprising a piston operatively engaging said actuating member and a passage defined along said indicator stem adapted to supply fluid from an associated source to act on said piston.

13. The valve as defined in claim 11 further comprising means for biasing said actuating member toward a valve open position.

14. The valve as defined in claim 11 wherein said actuating member has a smooth rounded end for engaging said flexible member.

* * * * *